(12) United States Patent
Zhou et al.

(10) Patent No.: US 10,911,137 B2
(45) Date of Patent: Feb. 2, 2021

(54) OPTICAL AMPLIFIER APPARATUS, OPTICAL COMMUNICATIONS STATION, AND OPTICAL COMMUNICATIONS SYSTEM

(71) Applicant: Huawei Technologies Co., Ltd., Shenzhen (CN)

(72) Inventors: Enbo Zhou, Dongguan (CN); Tianhai Chang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/735,890

(22) Filed: Jan. 7, 2020

(65) Prior Publication Data

US 2020/0145098 A1    May 7, 2020

Related U.S. Application Data

(63) Continuation of application No. PCT/CN2017/092242, filed on Jul. 7, 2017.

(51) Int. Cl.
*H04B 17/00* (2015.01)
*H04B 10/077* (2013.01)
(Continued)

(52) U.S. Cl.
CPC ........... *H04B 10/077* (2013.01); *H04B 10/25* (2013.01); *H04J 14/02* (2013.01)

(58) Field of Classification Search
CPC .. H04B 10/077; H04B 10/25; H04B 10/0795; H04B 10/0777; H04B 10/0731; H04B 10/0797; H04B 10/07955; H04J 14/02
(Continued)

(56) References Cited

U.S. PATENT DOCUMENTS 5,798,855 A    8/1998  Alexander et al.
6,411,407 B1   6/2002  Maxham
(Continued)

FOREIGN PATENT DOCUMENTS

CA    2282607 A1    3/2000
CN    1713550 A    12/2005
(Continued)

OTHER PUBLICATIONS

Suzuki, H. et al., "Optical signal quality monitor built into WDM linear repeaters using semiconductor arrayed waveguide grating filter monolithically integrated with eight photodiodes," Electronics Letters, vol. 35, No. 10, May 13, 1999, 2 pages.

*Primary Examiner* — Mohammad R Sedighian
(74) *Attorney, Agent, or Firm* — Slater Matsil, LLP

(57) ABSTRACT

This application discloses an optical amplifier apparatus including a first amplifier unit and a hybrid filter unit. The first amplifier unit is configured to receive a first beam including signal light and first monitoring light. The first amplifier unit is further configured to amplify the first beam to obtain a second beam. The hybrid filter unit is configured to: receive the second beam output by the first amplifier unit, and separate the first monitoring light and the signal light from the second beam. The hybrid filter unit is further configured to: transmit the first monitoring light in the second beam to a monitoring light detection apparatus of a first station through a first output port. The hybrid filter unit is further configured to: perform gain flattening filtering processing on the signal light in the second beam to obtain filtered signal light, and output the filtered signal light.

20 Claims, 7 Drawing Sheets

(51) Int. Cl.
*H04B 10/25* (2013.01)
*H04J 14/02* (2006.01)

(58) Field of Classification Search
USPC .......................................................... 398/26
See application file for complete search history.

(56) References Cited

U.S. PATENT DOCUMENTS

| | | | |
|---|---|---|---|
| 6,714,343 | B2 | 3/2004 | Goodbar et al. |
| 6,724,526 | B1 * | 4/2004 | Onaka ............... H04B 10/25073 |
| | | | 359/337.1 |
| 6,839,164 | B2 | 1/2005 | Kosaka et al. |
| 6,952,309 | B1 * | 10/2005 | Tsuzaki ............... H01S 3/06754 |
| | | | 359/341.41 |
| 2003/0059156 | A1 | 3/2003 | Feinberg et al. |
| 2005/0286898 | A1 | 12/2005 | Okuno |
| 2006/0140626 | A1 | 6/2006 | Robinson et al. |
| 2007/0206273 | A1 * | 9/2007 | Ghera ................. H04J 14/0221 |
| | | | 359/337 |
| 2008/0253763 | A1 | 10/2008 | Uda et al. |
| 2014/0270757 | A1 * | 9/2014 | van Lochem ....... H04J 14/0227 |
| | | | 398/34 |

FOREIGN PATENT DOCUMENTS

| | | |
|---|---|---|
| CN | 101267256 A | 9/2008 |
| CN | 101630972 A | 1/2010 |
| CN | 102624448 A | 8/2012 |
| CN | 105281827 A | 1/2016 |
| EP | 0751637 A2 | 1/1997 |
| WO | 0102903 A1 | 1/2001 |

* cited by examiner

OPTICAL AMPLIFIER APPARATUS, OPTICAL COMMUNICATIONS STATION, AND OPTICAL COMMUNICATIONS SYSTEM

CROSS-REFERENCE TO RELATED APPLICATIONS

This application is a continuation of International Application No. PCT/CN2017/092242, filed on Jul. 7, 2017, the disclosure of which is hereby incorporated by reference in its entirety.

TECHNICAL FIELD

This application relates to the optical communications field, and more specifically, to an optical amplifier apparatus, an optical communications station, and an optical communications system.

BACKGROUND

In a typical optical communications network, service signal light and an optical supervisory channel (OSC) are separated on a main optical path by a fiber interface unit (FIU), to implement separation and monitoring of the optical supervisory channel. A coarse wavelength division multiplexer is used inside an FIU board and can support functions such as demultiplexing, multiplexing, and online optical power detection. However, an insertion loss introduced by adding an additional FIU board to an entrance main optical path of an optical amplifier causes degradation (that is, a value of the insertion loss) of an optical signal-to-noise ratio (OSNR) of a link. In actual engineering, the insertion loss usually ranges from 1 dB to 1.5 dB. Consequently, service transmission performance is degraded.

SUMMARY

This application provides an optical amplifier apparatus, an optical communications station, and an optical communications system, to reduce an insertion loss of an optical communications link.

According to a first aspect, an optical amplifier apparatus is provided, including a first amplifier unit and a hybrid filter unit. The hybrid filter unit includes a first output port and a second output port.

The first amplifier unit may be configured to: receive a first beam sent by a second station, and amplify the first beam to obtain a second beam, where the first beam includes signal light and first monitoring light.

The hybrid filter unit may be configured to: receive the second beam output by the first amplifier unit, separate the first monitoring light and the signal light from the second beam, and transmit the first monitoring light in the second beam to a monitoring light detection apparatus of a first station through the first output port.

The hybrid filter unit is further configured to: perform gain flattening filtering processing on the signal light in the second beam to obtain filtered signal light, and transmit the filtered signal light through the second output port.

According to the optical communications station provided in this application, wavelength division multiplexing/demultiplexing of the monitoring light and the signal light can be implemented in the optical amplifier apparatus without a need of disposing an additional FIU, thereby reducing an insertion loss of an optical communications link and improving transmission performance of the link.

In addition, before the monitoring light is transmitted to the monitoring light detection apparatus, the optical amplifier apparatus amplifies the received beam, so that power of the monitoring light received by the monitoring light detection apparatus can be increased, thereby improving a modulation rate and detection sensitivity without affecting performance of a main optical path.

Optionally, the first amplifier unit may specifically receive a first beam transmitted by a first external optical fiber of the optical amplifier apparatus, where the first external optical fiber may be configured to connect the second station to the first station. The hybrid filter unit may be connected to a second external optical fiber of the optical amplifier apparatus through the second output port.

Optionally, the second external optical fiber may be configured to connect the hybrid filter unit to a signal light detection apparatus of the first station. In this case, the hybrid filter unit may transmit the filtered signal light to the signal light detection apparatus through the second output port.

Optionally, the second external optical fiber may be configured to connect the first station to a third station. In this case, the hybrid filter unit may transmit the filtered signal light to the third station through the second output port.

Optionally, the hybrid filter unit may include a first wavelength division demultiplexer and a gain flattening filter. The first wavelength division demultiplexer may be configured to separate the signal light and the first monitoring light from the second beam. The gain flattening filter may be configured to perform gain flattening filtering processing on the signal light in the second beam.

In an optional embodiment, the first wavelength division demultiplexer may be located in front of the gain flattening filter on an optical path. In this case, the hybrid filter unit may first perform wavelength division demultiplexing processing on the second beam, and then perform gain flattening filtering processing on the signal light obtained through the wavelength division demultiplexing processing.

The first wavelength division demultiplexer is configured to: receive the second beam output by the first amplifier unit, perform wavelength division demultiplexing processing on the second beam to obtain the signal light and the first monitoring light in the second beam, output the first monitoring light in the second beam through the first output port, and output the signal light in the second beam to the gain flattening filter. Correspondingly, the gain flattening filter is configured to: receive the signal light that is in the second beam and that is output by the first wavelength division demultiplexer, perform gain flattening filtering processing on the signal light in the second beam to obtain the filtered signal light, and output the filtered signal light through the second output port.

In this way, the hybrid filter unit may be specifically configured to perform gain flattening filtering processing on the signal light obtained through the separation.

In another optional embodiment, the first wavelength division demultiplexer may be located behind the gain flattening filter on an optical path. In this case, the hybrid filter unit first performs gain flattening filtering processing on the second beam, and then performs wavelength division demultiplexing processing.

The gain flattening filter may be configured to: receive the second beam output by the first amplifier unit, and perform gain flattening filtering processing on the second beam to obtain the filtered second beam. The first wavelength division demultiplexer may be configured to: receive the filtered second beam output by the gain flattening filter, perform wavelength division demultiplexing processing on the filtered second beam to obtain the filtered signal light and the first monitoring light, output the first monitoring light through the first output port, and output the filtered signal light through the second output port.

The filtered second beam may include the filtered signal light and the first monitoring light. In this way, the hybrid filter unit may be specifically configured to perform wavelength division demultiplexing processing on the filtered second beam including the filtered signal light and the first monitoring light.

In a first possible implementation of the first aspect, the optical amplifier apparatus further includes a wavelength division multiplexing unit, configured to: receive the filtered signal light output by the hybrid filter unit through the second output port, and receive second monitoring light; perform wavelength division multiplexing processing on the filtered signal light and the second monitoring light to obtain a third beam; and transmit the third beam to the third station.

In this case, the hybrid filter unit is connected to the wavelength division multiplexing unit, and is connected to the second external optical fiber through the wavelength division multiplexing unit, and the other end of the second external optical fiber may be connected to the third station.

In this case, optionally, the first station may be a forwarding station of service data carried by the signal light.

Optionally, the second monitoring light may be transmitted by a monitoring light transmission apparatus of the first station.

Optionally, the optical amplifier apparatus further includes a first beam splitting unit, configured to: receive the first monitoring light output by the hybrid filter unit through the first output port, perform beam splitting processing on the first monitoring light to obtain a first part of the first monitoring light and a second part of the first monitoring light, transmit the first part of the first monitoring light to the monitoring light detection apparatus of the first station, and transmit the second part of the first monitoring light to the wavelength division multiplexing unit, where the second monitoring light is the second part of the first monitoring light.

Optionally, optical power of the first part of the first monitoring light and optical power of the second part of the first monitoring light may be equal or not equal.

In an example, the optical power of the first part may be less than the optical power of the second part.

Optionally, the optical amplifier apparatus may further amplify the filtered signal light, and may specifically amplify the filtered signal light before or after performing wavelength division multiplexing on the filtered signal light.

In a second possible implementation of the first aspect, the optical amplifier apparatus further includes a second amplifier unit, configured to amplify the filtered signal light.

Optionally, the second amplifier unit may be configured to: receive the filtered signal light output by the hybrid filter unit through the second output port, and amplify the filtered signal light to obtain the amplified filtered signal light. The wavelength division multiplexing unit is specifically configured to: receive the amplified filtered signal light output by the second amplifier unit, and perform wavelength division multiplexing processing on the amplified filtered signal light and the second monitoring light to obtain the third beam.

Optionally, the second amplifier unit may be configured to: receive the third beam output by the wavelength division multiplexing unit, and amplify the third beam to obtain the amplified third beam; and transmit the amplified third beam to the third station.

In this way, the third beam is amplified, so that incident optical power of the second monitoring light can be increased, thereby improving detection sensitivity and performance of the monitoring light.

Optionally, the first amplifier unit and/or the second amplifier unit may include a pump light transmitter, a wavelength division multiplexer, and an erbium-doped fiber. The pump light transmitter may be configured to transmit pump light.

The wavelength division multiplexer in the first amplifier unit is configured to: receive the first beam transmitted by the first external optical fiber and the pump light transmitted by the pump light transmitter, and perform wavelength division multiplexing processing on the received first beam and pump light to obtain a fourth beam. The erbium-doped fiber in the first amplifier unit is configured to perform gain processing on the fourth beam output by the wavelength division multiplexer to obtain the second beam.

Similarly, the wavelength division multiplexer in the second amplifier unit may be configured to: receive the filtered signal light or the third beam and the pump light, and perform wavelength division multiplexing processing on the filtered signal light or the third beam and the pump light to obtain a wavelength division multiplexed beam. The erbium-doped fiber in the second amplifier unit may be configured to: receive the wavelength division multiplexed beam output by the wavelength division multiplexer, and perform gain processing on the wavelength division multiplexed beam to obtain the amplified third beam or the amplified filtered signal light.

Optionally, the optical amplifier apparatus may further include one or more optical isolators, to ensure unidirectional transmission of light.

Optionally, the optical amplifier apparatus may further include one or more optical power detection units, to detect power of the signal light.

In a third possible implementation of the first aspect, the optical amplifier apparatus further includes a second beam splitting unit, a second wavelength division demultiplexing unit, and a first optical power detection unit. The second beam splitting unit is configured to: receive the third beam output by the wavelength division multiplexing unit, and perform beam splitting processing on the third beam to obtain a first part of the third beam and a second part of the third beam, where optical power of the first part of the third beam is far greater than optical power of the second part of the third beam. The second beam splitting unit is further configured to transmit the first part of the third beam to the second external optical fiber. The second wavelength division demultiplexing unit is configured to: receive the second part that is of the third beam and that is output by the second beam splitting unit, and perform wavelength division demultiplexing processing on the second part of the third beam to obtain the signal light and the second monitoring light in the second part of the third beam. The first optical power detection unit is configured to: receive the signal light that is in the second part of the third beam and that is output by the second wavelength division demultiplexing unit, and detect power of the received signal light.

In a fourth possible implementation of the first aspect, the optical amplifier apparatus further includes a third beam splitting unit, a third wavelength division demultiplexing unit, and a second optical power detection unit. The third beam splitting unit is configured to: receive the first beam transmitted by the first external optical fiber, and perform beam splitting processing on the first beam to obtain a first part of the first beam and a second part of the first beam, where optical power of the first part of the first beam is far greater than optical power of the second part of the first beam. The first amplifier unit is specifically configured to: receive a third part that is of the first beam and that is output by the third beam splitting unit, and amplify the third part of the first beam to obtain the second beam. The third wavelength division demultiplexing unit is configured to: receive the second part that is of the first beam and that is output by the third beam splitting unit, and perform wavelength division demultiplexing processing on the second part of the first beam to obtain the signal light and the first monitoring light in the second part of the first beam. The second optical power detection unit is configured to: receive the signal light that is in the second part of the first beam and that is output by the third wavelength division demultiplexing unit, and detect power of the received signal light.

According to a second aspect, an optical communications station is provided, including a monitoring light detection apparatus and an optical amplifier apparatus.

The optical amplifier apparatus is configured to receive, through a first external optical fiber of the optical amplifier apparatus, a first beam sent by an upstream communications station, where the first beam includes signal light and first monitoring light. The optical amplifier apparatus is further configured to amplify the first beam to obtain a second beam. The optical amplifier apparatus is further configured to: separate the first monitoring light and the signal light from the second beam, and transmit the first monitoring light in the second beam to the monitoring light detection apparatus. The monitoring light detection apparatus is configured to: receive the first monitoring light output by the optical amplifier apparatus, and detect the first monitoring light. The optical amplifier apparatus is further configured to: perform gain flattening filtering processing on the signal light in the second beam to obtain filtered signal light, and transmit the filtered signal light to a second external optical fiber of the optical amplifier apparatus.

Optionally, the optical amplifier apparatus is specifically configured to: perform wavelength division demultiplexing processing on the second beam to obtain the signal light and the first monitoring light in the second beam, output the first monitoring light in the second beam to the monitoring light detection apparatus, and perform gain flattening filtering processing on the signal light in the second beam to obtain the filtered signal light.

Optionally, the optical amplifier apparatus is specifically configured to: perform gain flattening filtering processing on the second beam to obtain the filtered second beam, where a filtering band for the gain flattening filtering processing does not include a wavelength of the first monitoring light, and the filtered second beam includes the filtered signal light and the first monitoring light; and perform wavelength division demultiplexing processing on the filtered second beam to obtain the filtered signal light and the first monitoring light.

Optionally, the optical amplifier apparatus is further configured to: perform wavelength division multiplexing processing on the filtered signal light and second monitoring light to obtain a third beam, and transmit the third beam to a downstream communications station through the second external optical fiber.

Optionally, the optical communications station further includes a monitoring light transmission apparatus, configured to transmit the second monitoring light. The optical amplifier apparatus is further configured to receive the second monitoring light transmitted by the monitoring light transmission apparatus.

Optionally, the optical amplifier apparatus is further configured to: perform beam splitting processing on the first monitoring light in the second beam to obtain a first part of the first monitoring light and a second part of the first monitoring light, and transmit the first part of the first monitoring light to the monitoring light detection apparatus of the optical communication station, where the second monitoring light is the second part of the first monitoring light.

Optionally, the optical amplifier apparatus is further configured to: before performing wavelength division multiplexing processing on the second monitoring light and the filtered signal light, amplify the filtered optical signal to obtain the amplified filtered optical signal; and that the optical amplifier apparatus performs wavelength division multiplexing processing on the second monitoring light and the filtered signal light includes: performing, by the optical amplifier apparatus, wavelength division multiplexing processing on the second monitoring light and the amplified filtered signal light.

Optionally, the optical amplifier apparatus is further configured to: before transmitting the third beam to the downstream communications station through the second external optical fiber, amplify the third beam to obtain the amplified third beam; and that the optical amplifier apparatus transmits the third beam to the downstream communications station through the second external optical fiber includes: transmitting, by the optical amplifier apparatus, the amplified third beam to the downstream communications station through the second external optical fiber.

Optionally, the optical communications station further includes a signal light detection apparatus. The optical amplifier apparatus is specifically configured to transmit the filtered signal light to the signal light detection apparatus through the second external optical fiber. The signal light detection apparatus is configured to demodulate the filtered signal light transmitted by the optical amplifier apparatus to obtain data carried by the filtered signal light.

Optionally, the optical amplifier apparatus may be the optical amplifier apparatus according to any one of the first aspect or the possible implementations of the first aspect.

According to a third aspect, an optical communications system is provided, including the optical communications station and the upstream communications station according to any one of the second aspect or the possible implementations of the second aspect. The upstream communications station is configured to: transmit the signal light and the first monitoring light; amplify the signal light to obtain the amplified signal light; perform wavelength division multiplexing processing on the first monitoring light and the amplified signal light to obtain the first beam; and transmit the first beam to the optical communications station through the first external optical fiber.

DETAILED DESCRIPTION OF ILLUSTRATIVE EMBODIMENTS

The following describes the technical solutions in the embodiments of this application with reference to the accompanying drawings in the embodiments of this application.

Figure 1:
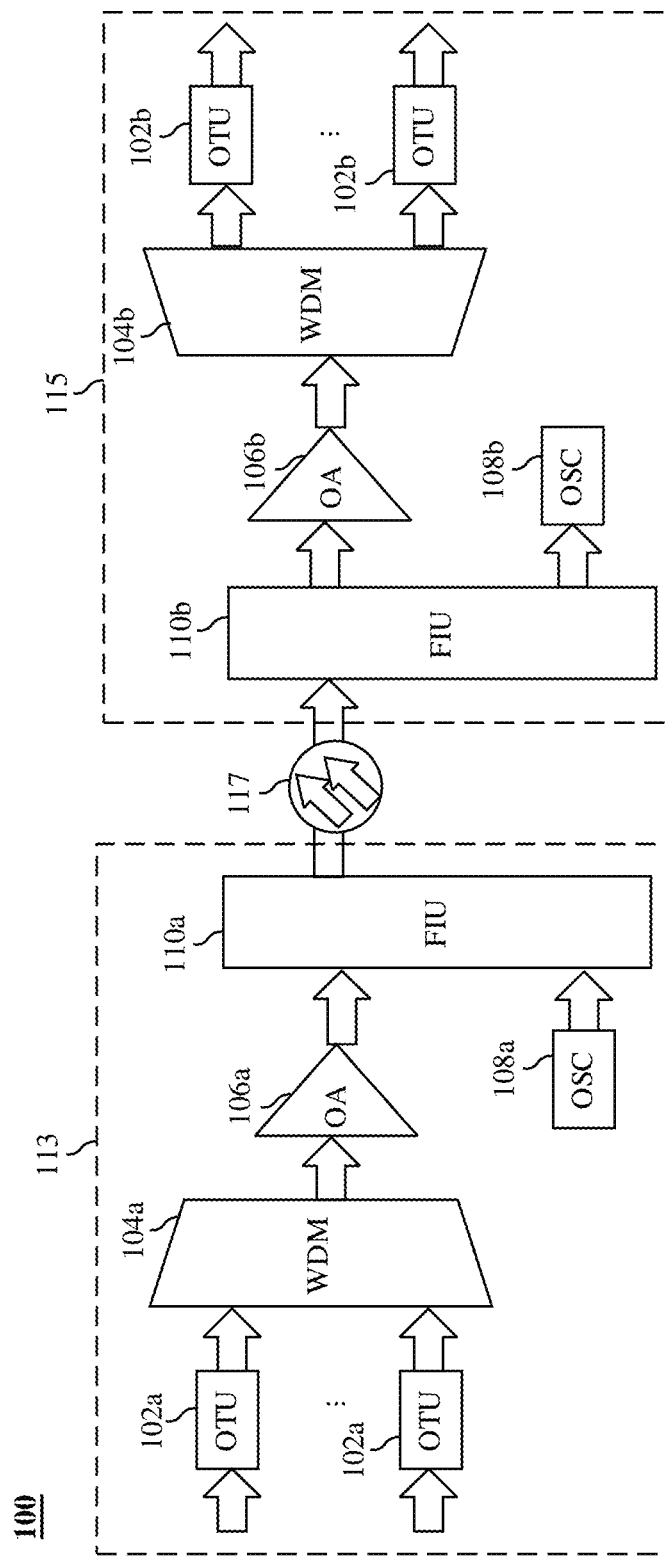
FIG. 1 is a schematic diagram of a typical wavelength division multiplexing system.

FIG. 1 shows an example of a typical wavelength division multiplexing (WDM) system 100. The WDM system 100 may include a plurality of optical communications stations, and data may be transmitted between the optical communications stations through an optical fiber 117. The optical communications station may include one or more optical transmission units (OTU), a wavelength division multiplexer/demultiplexer (WDM), an optical amplifier (OA), an OSC transmitter/detector, and an FIU board. Optionally, FIG. 1 shows an example of two optical communications stations: an optical communications station 113 and an optical communications station 115. However, the WDM system 100 may alternatively include more optical communications stations. This is not limited in this embodiment of this application.

It is assumed that the optical communications station 113 needs to send data to the optical communications station 115. In this case, one or more OTUs 102a in the optical communications station 113 may transmit signal light of different wavelengths. The signal light of different wavelengths may be combined into one beam of signal light in a WDM 104a. The beam of signal light is then amplified in an OA 106a to obtain one beam of amplified signal light.

An OSC transmitter 108a may transmit an OSC. A wavelength of the OSC is different from the wavelength of the signal light transmitted by the OTU 102a. In an example, the wavelength of the OSC may be 1510 nm or 1600 nm, and the wavelength of the signal light may range from 1530 nm to 1560 nm. However, this embodiment of this application is not limited thereto.

An FIU 110a may receive the beam of signal light transmitted by the OA 106a and the OSC transmitted by the OSC transmitter 108a, perform wavelength division multiplexing processing on the received signal light and OSC to obtain a wavelength division multiplexed beam, and then transmit the wavelength division multiplexed beam to the optical communications station 115 through the optical fiber 117.

An FIU 110b in the optical communications station 115 may receive the beam transmitted by the optical communications station 113 through the optical fiber 117, and perform wavelength division demultiplexing processing on the beam to obtain the signal light and the OSC in the beam. The OSC in the beam may be transmitted to an OSC detector 108b, and the signal light in the beam may be transmitted to an OA 106b. The OA 106b may amplify the received signal light to obtain the amplified signal light, and transmit the amplified signal light to a WDM 104b. The WDM 104b may split the received signal light into a plurality of beams of signal light of different wavelengths, and respectively transmit the plurality of beams of signal light of different wavelengths to corresponding OTUs 102b.

As can be learned from the foregoing, both the beam sent by and the beam received by the optical communications station need to be processed by the FIU, and a link insertion loss is introduced into the FIU. Consequently, service transmission performance of an optical communications network is degraded. In addition, long-distance optical fiber transmission reduces received optical power of the OSC, causing a relatively low rate of the OSC, and the rate is usually only 155 Mb/s.

In this embodiment of this application, the optical amplifier may support some or all of functions of the FIU, so that the FIU can be omitted from the optical communications station, thereby reducing the link insertion loss and improving transmission performance of a link.

Figure 2:
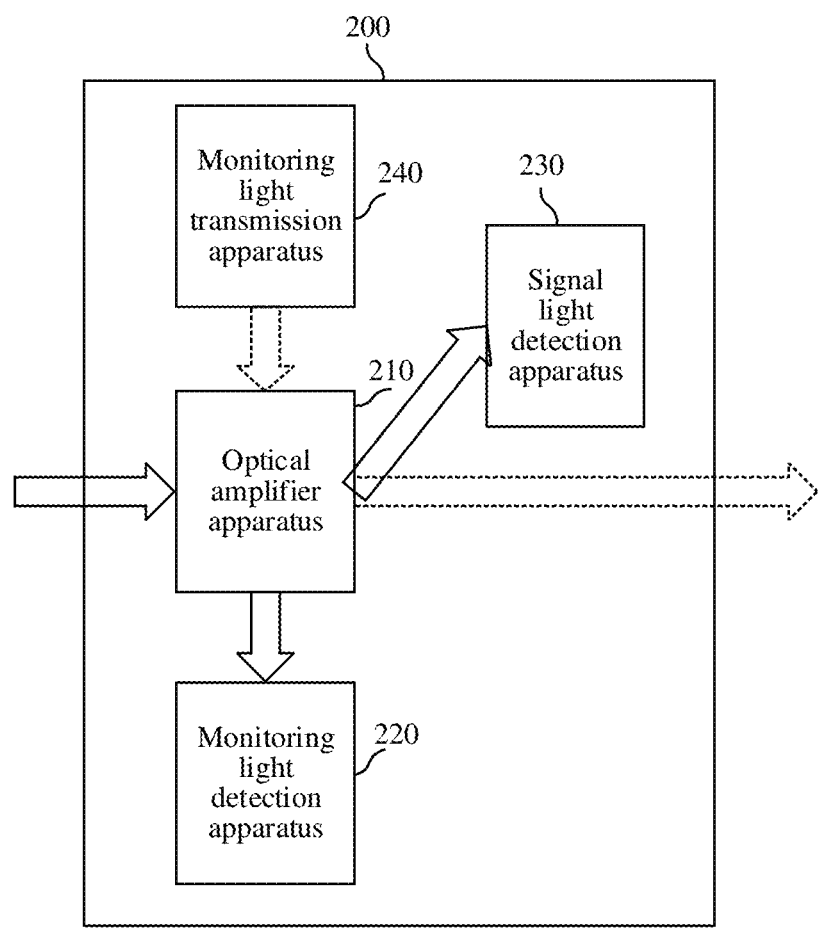
FIG. 2 is a schematic block diagram of an optical communications station according to an embodiment of this application.

FIG. 2 shows an optical communications station 200 according to an embodiment of this application. The optical communications station 200 may be an optical receiving station, configured to receive a beam that carries data and that is transmitted by an upstream communications station.

The optical communications station 200 includes an optical amplifier apparatus 210 and a monitoring light detection apparatus 220. The optical amplifier apparatus 210 may be configured to receive the beam transmitted by the upstream communications station. The beam may include signal light and monitoring light. In other words, the beam may be a wavelength division multiplexed beam of the signal light and the monitoring light. The signal light may be light carrying user data, and the monitoring light may be light used to monitor channel quality, and may specifically carry frame synchronization information or the like.

The optical amplifier apparatus 210 may further amplify the received beam to obtain an amplified beam, separate the signal light and the monitoring light from the amplified beam, and transmit the monitoring light obtained through the separation to the monitoring light detection apparatus 220.

The monitoring light detection apparatus 220 may detect the received monitoring light. For example, the monitoring light detection apparatus 200 may determine link quality between the optical communications station 200 and the upstream communications station based on the received monitoring light. For example, the monitoring light detection apparatus 200 determines whether a fiber cut occurs or determines fiber transmission attenuation. This is not limited in this embodiment of this application.

Optionally, the monitoring light detection apparatus 220 may be specifically a photodiode (PD) or an avalanche photodiode (APD). However, this embodiment of this application is not limited thereto.

Optionally, if the optical communications station 200 is a destination station of data carried by the signal light, the optical amplifier apparatus 210 may transmit the signal light obtained through the separation to a signal light detection apparatus 230 of the optical communications station 200. The signal light detection apparatus 230 may perform one or more types of processing on the received signal light. Optionally, the one or more types of processing may include demodulation processing to obtain the data carried by the signal light. Optionally, if the signal light includes light of a plurality of wavelengths, the optical communications station 200 may include a plurality of signal light detection apparatuses 230. In addition, the optical communications station 200 may further include a wavelength division demultiplexing apparatus, configured to: perform wavelength division demultiplexing processing on the signal light output by the optical amplifier apparatus 210 to obtain a plurality of paths of signal light of different wavelengths, and respectively transmit the plurality of paths of signal light to corresponding signal light detection apparatuses. However, this embodiment of this application is not limited thereto.

In this way, before the monitoring light is transmitted to the monitoring light detection apparatus 220, the optical amplifier apparatus 210 amplifies the received beam, so that power of the monitoring light received by the monitoring light detection apparatus 220 can be increased, thereby improving a modulation rate and detection sensitivity without affecting performance of a main optical path.

Optionally, if the optical communications station 200 is not the destination station of data carried by the signal light, that is, the optical communications station 200 is a forwarding station of the data carried by the signal light, the optical amplifier apparatus 210 may transmit the signal light obtained through the separation to a downstream communications station. This is not limited in this embodiment of this application.

Optionally, before transmitting the signal light obtained through the separation to the downstream communications station, the optical amplifier apparatus 210 may further perform gain flattening filtering processing on the signal light to obtain the filtered signal light. An optical spectrum of the filtered signal light may satisfy a particular flatness characteristic. The optical amplifier apparatus 210 may then transmit the filtered signal light to the downstream communications station. However, this embodiment of this application is not limited thereto.

In an optional embodiment, the optical amplifier apparatus 210 may transmit all the monitoring light obtained through the separation to the monitoring light detection apparatus 220. In this case, if the optical communications station 200 is a forwarding station of data, the optical communications station 200 may further include a monitoring light transmission apparatus 240, configured to transmit the monitoring light. In this case, the optical amplifier apparatus 210 may further receive the monitoring light transmitted by the monitoring light transmission apparatus 240, perform wavelength division multiplexing processing on the received monitoring light and the signal light obtained through the separation to obtain a wavelength division multiplexed beam, and transmit the wavelength division multiplexed beam to the downstream communications station.

In this case, optionally, monitoring light in a beam received by each optical communications station in a data transmission process comes from a previous optical communications station of the optical communications station. Each station of at least one forwarding node of the data may have a monitoring light transmission apparatus and a monitoring light detection apparatus. Monitoring light detected by the monitoring light detection apparatus comes from a previous optical communications node, and monitoring light sent by the monitoring light transmission apparatus is transmitted to a next optical communications node. However, this is not limited in this application.

Optionally, the monitoring light transmission apparatus may be specifically a direct modulated laser (DML) or an electro-absorption modulated laser (EML). However, this embodiment of this application is not limited thereto.

Optionally, the monitoring light transmission apparatus 240 and the monitoring light detection apparatus 220 may be separately disposed or may be integrated, to constitute a monitoring light transceiver. However, this embodiment of this application is not limited thereto.

Optionally, the monitoring light transmission apparatus 240 and/or the monitoring light detection apparatus 220 may be separately disposed independently of the optical amplifier apparatus 210. Alternatively, at least one of the monitoring light transmission apparatus 240 and the monitoring light detection apparatus 220 may be integrated inside the optical amplifier apparatus 210. This is not limited in this embodiment of this application.

In another optional embodiment, the optical amplifier apparatus 210 may alternatively perform beam splitting processing on the monitoring light obtained through the separation to obtain a first part of beam and a second part of beam, and transmit the first part of beam to the monitoring light detection apparatus 220. In this case, optionally, the optical amplifier apparatus 210 may perform wavelength division multiplexing processing on the second part of beam and the signal light obtained through the separation to obtain a wavelength division multiplexed beam, and transmit the wavelength division multiplexed beam to the downstream communications station.

Optionally, power of the first part of beam may be less than power of the second part of beam. However, a ratio of optical power of the first part of beam to optical power of the second part of beam is not specifically limited in this embodiment of this application.

In this embodiment of this application, the optical amplifier apparatus 210 may be specifically a first-stage or second-stage amplifier apparatus. In an optional embodiment, the optical amplifier apparatus 210 may perform second-stage amplification processing on the signal light. In this case, before performing wavelength division multiplexing processing on the monitoring light transmitted by the monitoring light transmission apparatus or the second part of beam in the monitoring light obtained through the separation and the signal light, the optical amplifier apparatus 210 may amplify the signal light obtained through the separation to obtain the amplified signal light, and then perform wavelength division multiplexing processing on the amplified signal light and the monitoring light to obtain the wavelength division multiplexed beam.

In another optional embodiment, after performing wavelength division multiplexing processing on the signal light obtained through the separation and the monitoring light to obtain the wavelength division multiplexed beam, the optical amplifier apparatus 210 may alternatively amplify the wavelength division multiplexed beam to obtain an amplified wavelength division multiplexed beam, and send the amplified wavelength division multiplexed beam to the downstream communications station.

In this way, before being transmitted to the downstream communications station, the monitoring light transmitted by the optical communications station can be amplified in the wavelength division multiplexed beam, so that incident power of the monitoring light can be increased, thereby improving modulation efficiency and detection sensitivity.

In this embodiment of this application, optionally, before amplifying or performing wavelength division multiplexing processing on the signal light (or the filtered signal light)

obtained through the separation, the optical amplifier apparatus 210 may further perform optical power attenuation processing on the signal light (or the filtered signal light), so that power of the signal light satisfies an operating range of a subsequent optical device. Optionally, the optical amplifier apparatus 210 may further perform dispersion cancellation processing on the signal light. However, this is not limited in this embodiment of this application.

In this embodiment of this application, optionally, the optical amplifier apparatus 210 may further detect optical power of signal light in a received beam, for example, before and/or after amplifying the signal light, detect the optical power of the signal light one or more times through beam splitting. This is not limited in this embodiment of this application.

Therefore, according to the optical communications station provided in this embodiment of this application, wavelength division multiplexing/demultiplexing can be performed on the monitoring light and the signal light in the optical amplifier apparatus 210 without a need of disposing an additional FIU, thereby reducing an insertion loss of an optical communications link and improving transmission performance of the link.

Figure 3:
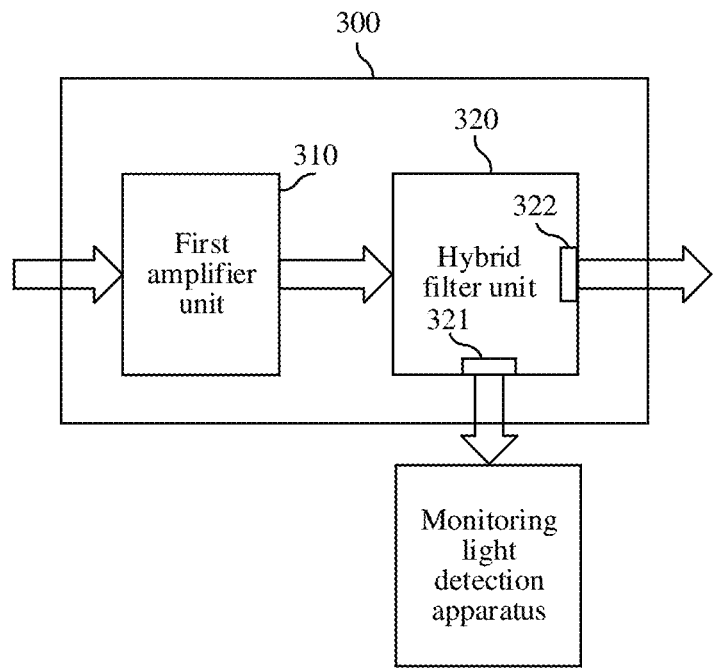
FIG. 3 is a schematic block diagram of an optical amplifier apparatus according to an embodiment of this application.

FIG. 3 is a schematic structural diagram of an optical amplifier apparatus 300 according to an embodiment of this application. The optical amplifier apparatus 300 may be specifically the optical amplifier apparatus 210 in FIG. 2. However, this embodiment of this application is not limited thereto.

As shown in FIG. 3, the optical amplifier apparatus 300 may include a first amplifier unit and a hybrid filter unit. The hybrid filter unit includes a first output port and a second output port.

The first amplifier unit 310 may be configured to receive a first beam that is sent by a second station and that is transmitted by an external optical fiber of the optical amplifier apparatus, where the first beam includes signal light and first monitoring light.

The second station may be specifically an upstream communications station of a first station to which the optical amplifier apparatus belongs. The first beam input from an input port may be a wavelength division multiplexed beam obtained by performing wavelength division multiplexing processing on the signal light and the first monitoring light.

The first amplifier unit 310 may be further configured to amplify the first beam to obtain a second beam.

The second beam may be an amplified first beam. Correspondingly, the second beam may include amplified signal light and first monitoring light.

Optionally, after obtaining the second beam, the first amplifier unit 310 may output the second beam.

In an optional example, the first amplifier unit may include a pump light transmitter, a wavelength division multiplexer, and an erbium-doped fiber (EDF). Specifically, the pump light transmitter may be configured to transmit pump light. A wavelength of the pump light may be different from a wavelength of the signal light and a wavelength of the monitoring light. For example, the wavelength of the pump light may be 980 nm. However, this is not limited in this embodiment of this application. The wavelength division multiplexer may be configured to: receive the first beam and the pump light transmitted by the pump light transmitter, and perform wavelength division multiplexing processing on the received first beam and pump light to obtain a fourth beam. The erbium-doped fiber may be configured to amplify the fourth beam output by the wavelength division multiplexer to obtain the second beam.

Optionally, the first amplifier unit 310 may further include another device, or may amplify the first beam in another manner. This is not limited in this embodiment of this application.

The hybrid filter unit 320 may be configured to: receive the second beam output by the first amplifier unit 310, separate the first monitoring light and the signal light from the second beam, and output, through the first output port 321, the first monitoring light obtained through the separation.

Specifically, the second beam includes the amplified first monitoring light and the amplified signal light. Correspondingly, the first monitoring light obtained through the separation may be specifically the amplified first monitoring light included in the second beam, and the signal light obtained through the separation may be the amplified signal light included in the second beam.

Optionally, the hybrid filter unit 320 may specifically perform wavelength division demultiplexing processing on the second beam, to separate the first monitoring light and the signal light from the second beam. For example, the hybrid filter unit 320 may include a coarse wavelength division multiplexer/demultiplexer and a dense wavelength division multiplexer/demultiplexer, configured to separate the first monitoring light and the signal light from the second beam. However, this is not limited in this embodiment of this application.

The first output port 321 may be connected to a monitoring light detection apparatus. The monitoring light detection apparatus may be a device that is integrated inside the optical amplifier apparatus 300 or is independent of the optical amplifier apparatus 300. This is not limited in this embodiment of this application.

The hybrid filter unit 320 may be further configured to: perform gain flattening filtering processing on the signal light obtained through the separation to obtain filtered signal light, and output the filtered signal light through the second output port 322. For example, the hybrid filter unit 320 may include a gain flattening filter (GFF), configured to perform gain flattening filtering processing on the signal light. However, this embodiment of this application is not limited thereto.

Optionally, the hybrid filter unit 320 may directly output the filtered signal light, or may further process the filtered signal light, and output processed filtered signal light. This is not limited in this embodiment of this application.

The second output port may be connected to a signal light detection apparatus and/or a downstream communications station of an optical communications station. In an example, if the optical communications station 300 is a destination station of the signal light, the filtered signal light output by the second output port 322 may be transmitted to the signal light detection apparatus of the optical communications station. In this case, optionally, if the optical amplifier apparatus 300 is a first-stage amplifier apparatus, the hybrid filter unit may alternatively not perform gain flattening filtering processing on the signal light obtained through the separation, but directly transmit, through the second output port 322, the signal light obtained through the separation to the signal light detection apparatus. In another example, if the optical communications station is not the destination station of the signal light, the filtered signal light output by the second output port 322 may be transmitted to a downstream communications station of the optical communications station to which the optical amplifier apparatus 300 belongs. However, this is not limited in this embodiment of this application.

Figure 4:
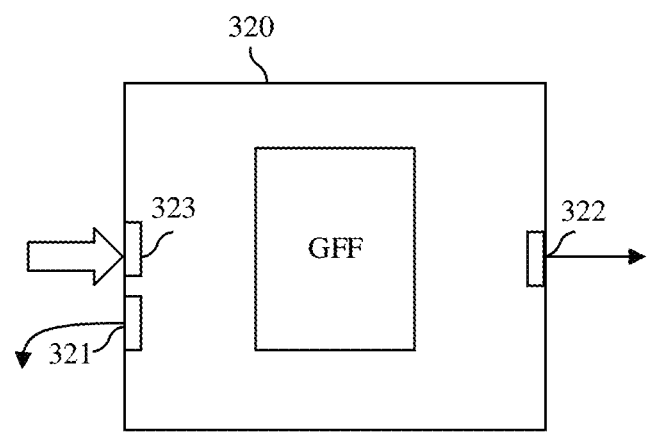
FIG. 4 is a schematic diagram of an example of a hybrid filter unit according to an embodiment of this application.

The hybrid filter unit 320 may be implemented in a plurality of manners. In an optional example, as shown in FIG. 4, the first output port of the hybrid filter unit 320 may be optionally a reflection exit. In this case, the hybrid filter unit 320 may use an optical reflection component or another component to transmit the first monitoring light to the first output port. Optionally, the first output port and an input port of the hybrid filter unit 320 may be located on a same side of the hybrid filter unit 320. However, this embodiment of this application is not limited thereto.

In this embodiment of this application, optionally, the hybrid filter unit 320 may include the coarse wavelength division multiplexer and the gain flattening filter. In an example, the coarse wavelength division multiplexer is configured to: receive the second beam, perform wavelength division demultiplexing processing on the second beam to obtain the signal light and the first monitoring light in the second beam, and separately output the signal light and the first monitoring light, where the output first monitoring light may be output through the first output port. The gain flattening filter may be configured to: receive the signal light output by the coarse wavelength division multiplexer, and perform gain flattening filtering processing on the signal light to obtain the filtered signal light. In another example, the gain flattening filter may be configured to: receive the second beam, and perform gain flattening filtering processing on the second beam to obtain a filtered beam. Optionally, a filtering band of the gain flattening filter may include a wavelength of the signal light, and does not include a wavelength of the first monitoring light. In this case, filtering of the second beam by the gain flattening filter is substantially filtering of the signal light in the second beam. The coarse wavelength division multiplexer may be configured to: receive the filtered beam output by the gain flattening filter, and perform wavelength division demultiplexing processing on the filtered beam to obtain the signal light (namely, the filtered signal light) in the filtered beam and the first monitoring light. A location relationship between the gain flattening filter and the coarse wavelength division multiplexer is not limited in this embodiment of this application.

Optionally, the hybrid filter unit 320 may further include an isolator. The isolator is configured to perform direction isolation to allow only light in a specific direction to pass. Optionally, the isolator may be located in front of the coarse wavelength division multiplexer and/or a gain flattening filter on an optical path. To be specific, the coarse wavelength division multiplexer and/or the gain flattening filter are/is specifically configured to receive light output by the isolator. However, this is not limited in this embodiment of this application. Optionally, the hybrid filter unit 320 may further include another device. This is not limited in this embodiment of this application.

Figure 5:
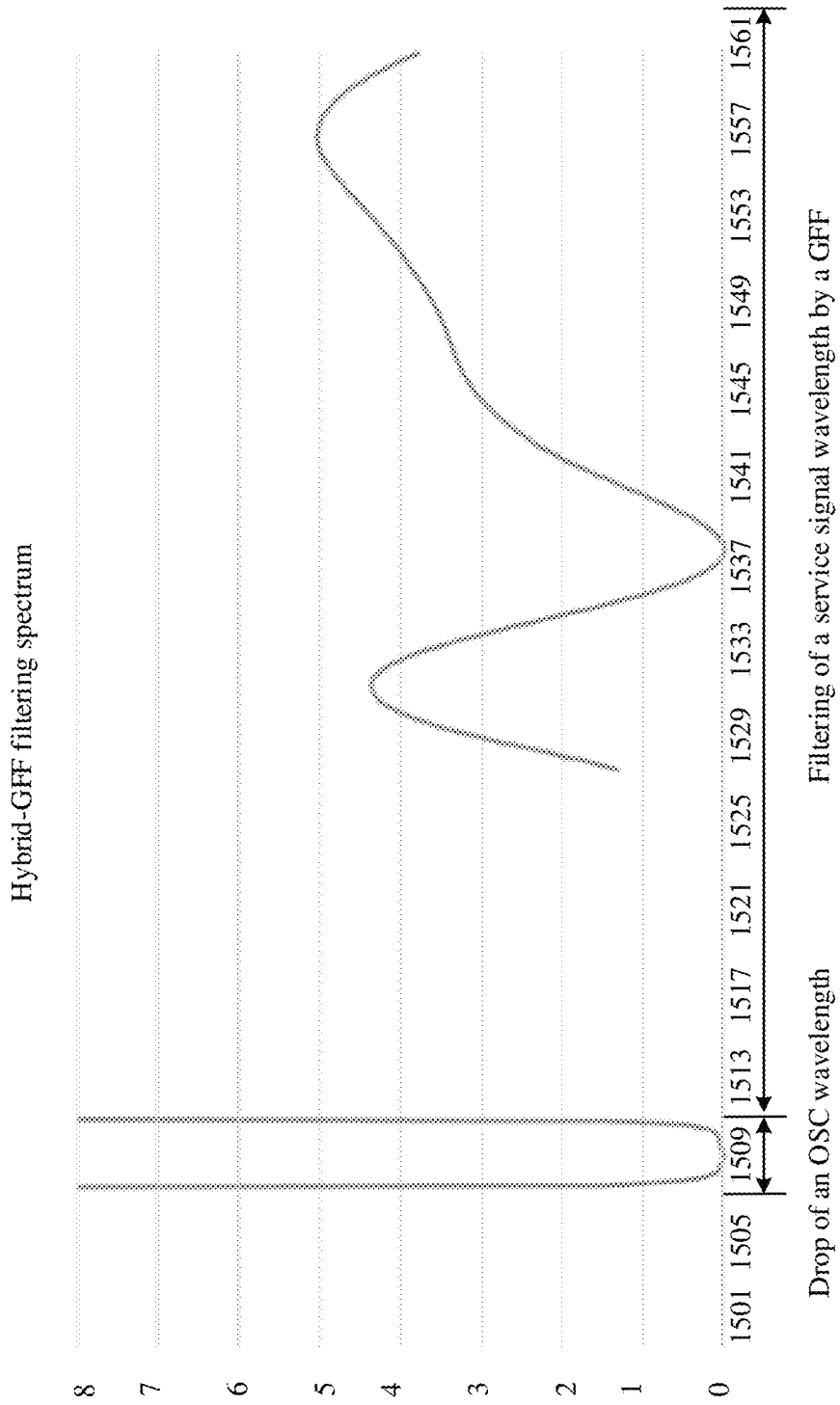
FIG. 5 is a schematic diagram of an example of an operating band of a hybrid filter unit according to an embodiment of this application.
Figure 6:
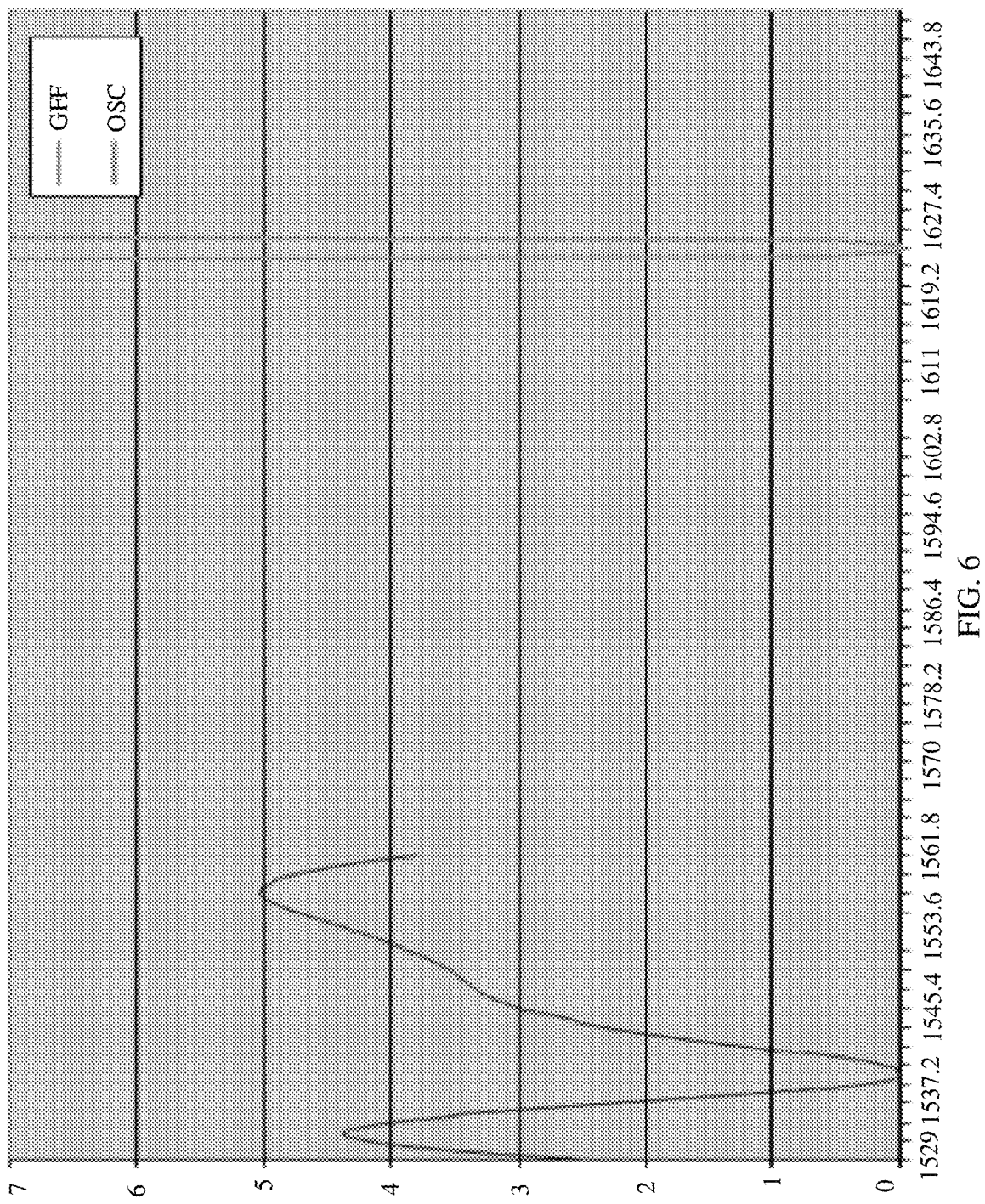
FIG. 6 is a schematic diagram of another example of an operating band of a hybrid filter unit according to an embodiment of this application.

In an optional example, the hybrid filter unit 320 may be specifically obtained by improving or integrating the gain flattening filter (GFF), for example, is obtained by adding one or more devices and a reflection exit based on the existing GFF. Correspondingly, the hybrid filter unit may also be referred to as a hybrid GFF. For example, as shown in FIG. 4, an input port 323 is configured to input a wavelength division multiplexed beam. The first output port 321 may be an added output port of the GFF, and may be configured to output monitoring light. The second output port 322 may be an original output port of the GFF, and may be configured to output the signal light obtained through gain flattening filtering. In an example shown in FIG. 5, a reflection wavelength in the hybrid GFF may be approximately 1510 nm, to perform filtering to obtain light having a wavelength of the OSC, and a wavelength for the gain flattening filtering may range from 1528 nm to 1562 nm, to perform filtering to obtain the signal light carrying service data. Optionally, the wavelength of the OSC may be alternatively any other value different from a wavelength of the signal light. For example, as shown in FIG. 6, the wavelength of the OSC may be alternatively approximately 1625 nm. In this case, the wavelength of the OSC is greater than that of the signal light, an OSC filtering window is located in a transparent area of an erbium-doped fiber, and a gain coefficient of the erbium-doped fiber is equal to an absorption coefficient. In this way, even if a bump laser in the optical amplifier becomes faulty, a case in which the OSC is absorbed by the erbium-doped fiber and attenuated and the OSC consequently has excessively low power and cannot be detected can be avoided, thereby improving system performance.

Optionally, the first monitoring light output through the first output port of the hybrid filter unit 320 may be transmitted to the monitoring light detection apparatus of the first station, and the monitoring light detection apparatus may perform power detection on the first monitoring light. In this way, the first monitoring light in the received beam is amplified by the first amplifier unit in the optical amplifier apparatus 300, so that the optical power of the monitoring light received by the monitoring light detection apparatus can be increased, thereby improving a monitoring light detection capability and detection sensitivity of a system.

In this embodiment of this application, in an optional embodiment, if the optical amplifier apparatus belongs to the first station, and the first station is the destination station of the service data carried by the signal light, the optical amplifier apparatus may transmit the processed signal light (for example, the filtered signal light) to the signal light detection apparatus of the first station, and the signal light detection apparatus processes the received signal light.

In another optional embodiment, if the optical amplifier apparatus 300 belongs to the first station, and the first station is not the destination station of the service data carried by the signal light, the optical amplifier apparatus 300 may transmit, through an external optical fiber of the optical amplifier apparatus, the processed signal light to the downstream communications station, for example, a third station.

Optionally, the optical amplifier apparatus 300 may further include a wavelength division multiplexing unit, configured to: receive the filtered signal light output by the hybrid filter unit 320, and perform wavelength division multiplexing processing on the filtered signal light and second monitoring light to obtain a third beam. In this case, correspondingly, the second output port may be specifically configured to: receive the third beam output by the wavelength division multiplexing unit, and transmit the third beam to an external optical fiber of the optical amplifier apparatus 300, that is, transmit the third beam to a second external optical fiber connected to the third station. In this way, the third station may process the received third beam to obtain monitoring light in the third beam, and further detect the monitoring light in the third beam, to determine information such as a link status between the first station and the third station. However, this embodiment of this application is not limited thereto.

In this embodiment of this application, in an example, the second monitoring light may be transmitted by the first station. In this case, the first station may further include a monitoring light transmission apparatus, configured to transmit the second monitoring light. Correspondingly, the wavelength division multiplexing unit is further configured to receive the second monitoring light transmitted by the monitoring light transmission apparatus. In this way, the first station may detect the first monitoring light included in the first beam sent by the upstream communications station, for example, the second station, to obtain information such as a link status between the first station and the second station, and send, to the downstream communications station, for example, the third station, the third beam including the second monitoring light transmitted by the first station, so that the third station obtains the information such as the link status between the first station and the third station based on the second monitoring light in the received third beam.

In another example, the second monitoring light may alternatively come from the first monitoring light, and the second monitoring light may be obtained by processing the first monitoring light for zero times, one time, or a plurality of times. Specifically, the optical amplifier apparatus 300 may separate processed first monitoring light into two parts, transmit one of the two parts to the monitoring light detection apparatus of the first station, and perform wavelength division multiplexing on the other part and the processed signal light, to transmit the other part and the processed signal light to the third station together. In this case, the second monitoring light is a part of the first monitoring light. For example, the optical amplifier apparatus 300 may further include a first beam splitting unit, configured to: receive the first monitoring light output by the first output port of the hybrid filter unit 320, and perform beam splitting processing on the received first monitoring light to obtain a first part and a second part of the first monitoring light. The first part of the first monitoring light may be transmitted to the monitoring light detection apparatus of the first station, and the second part of the first monitoring light may be used as the second monitoring light, where the second monitoring light and the filtered signal light are transmitted to the third station together. However, this embodiment of this application is not limited thereto.

In an optional embodiment, the optical amplifier apparatus 300 may directly transmit the third beam to the second external optical fiber connected to the third station. In this case, the optical amplifier apparatus 300 performs first-stage amplification on the signal light. In another optional embodiment, the optical amplifier apparatus 300 may alternatively perform second-stage amplification on the signal light. For example, the optical amplifier apparatus 300 may amplify the filtered signal light before or after performing wavelength division multiplexing processing on the filtered signal light and the second monitoring light. In this case, optionally, the optical amplifier apparatus 300 may further include a second amplifier unit, configured to amplify the filtered signal light or the third beam. In an example, the second amplifier unit may be configured to: receive the filtered signal light output by the hybrid filter unit 320, and amplify the filtered signal light to obtain the amplified filtered signal light. In this case, the wavelength division multiplexing unit may be configured to: receive the amplified filtered signal light output by the second amplifier unit, and perform wavelength division multiplexing processing on the amplified filtered signal light and the second monitoring light to obtain the third beam. In another example, the second amplifier unit may be configured to: receive the third beam output by the wavelength division multiplexing unit, and amplify the third beam to obtain the amplified third beam. In this case, the second output port may be configured to: receive the amplified third beam output by the second amplifier unit, and transmit the amplified third beam to the second external optical fiber. In this way, the third beam is amplified, to amplify the second monitoring light in the third beam, so that incident power of the second monitoring light can be increased, thereby further improving detection sensitivity of the monitoring light in the system.

In this embodiment of this application, optionally, the amplifier unit, for example, the first amplifier unit and/or the second amplifier unit, in the optical amplifier apparatus may include a pump light transmitter, a wavelength division multiplexer, and an erbium-doped fiber (EDF). The pump light transmitter may be configured to transmit pump light, and a wavelength of the pump light may be different from the wavelength of the signal light and the wavelength of the OSC. The wavelength division multiplexer may be configured to: receive the pump light transmitted by the pump light transmitter and a beam, for example, the first beam, the filtered signal light, or the third beam, transmitted on a main optical path, and perform wavelength division multiplexing processing on the received pump light and the beam on the main optical path, to obtain the fourth beam. The erbium-doped fiber may receive the fourth beam output by the wavelength division multiplexer, and amplify the fourth beam to obtain an amplified beam, for example, the second beam, the amplified filtered signal light, or the amplified third beam. This is not limited in this embodiment of this application.

Optionally, the optical amplifier apparatus 300 may further include an optical power attenuation unit, configured to perform power attenuation processing on the filtered signal light output by the hybrid filter unit 320 to obtain attenuated filtered signal light. In this case, the second amplifier unit or the wavelength division multiplexing unit may receive the attenuated filtered signal light output by the optical power attenuation unit, and process the received light. In an example, the power attenuation unit may include a variable optical attenuator (VOA). However, this embodiment of this application is not limited thereto.

Optionally, the optical amplifier apparatus 300 may further include a dispersion compensation unit, configured to perform dispersion compensation processing on the filtered signal light output by the hybrid filter unit 320 to obtain compensated filtered signal light. In this case, the second amplifier unit or the wavelength division multiplexing unit may receive the compensated filtered signal light output by the dispersion compensation unit, and process the received light. However, this embodiment of this application is not limited thereto.

In this case, the wavelength division multiplexing unit or the second amplifier unit may be specifically configured to process the attenuated filtered signal light and/or the compensated filtered signal light.

Optionally, the optical amplifier apparatus may further include at least one optical power detection unit, configured to detect optical power of the signal light. In an example, the optical power detection unit may include a beam splitter and an optical power detector. Optionally, the optical power detector may be specifically a photoelectric detector (photoelectric detector, PD). However, this embodiment of this application is not limited thereto. Specifically, the beam splitter may be configured to split the received beam (for example, simple signal light or a wavelength division multiplexed beam including the monitoring light and the signal light) into at least two parts, for example, may split the received beam into two beams having different power. A part having relatively large optical power may continue to be transmitted on the main optical path, while a part having relatively small optical power may be transmitted to the optical power detector. The optical power detector may be configured to detect optical power of the part having relatively small optical power. Optionally, to ensure transmission performance of the signal light transmitted on the main optical path, optical power of the part having relatively large optical power may be far greater than the optical power of the part having relatively small optical power. For example, a ratio of the optical power of the part having relatively small optical power to the optical power of the part having relatively large optical power is 1:99 or 3:97. This is not limited in this embodiment of this application.

Optionally, if a beam received by the optical power detection unit includes signal light and monitoring light, for example, the optical power detection unit is disposed in front of the hybrid filter unit or behind the wavelength division multiplexing unit in the optical amplifier apparatus, the part having relatively small optical power may also include the signal light and the monitoring light. In this case, the optical power detection unit may further include a wavelength division demultiplexer, for example, a coarse wavelength division demultiplexer, configured to: receive a beam that has relatively small optical power and that is output by the beam splitter, and perform wavelength division demultiplexing processing on the beam to obtain the signal light and the monitoring light in the beam that has relatively small power. Correspondingly, the optical power detector may specifically receive the signal light output by the wavelength division demultiplexer. However, this embodiment of this application is not limited thereto.

Optionally, the optical amplifier apparatus 300 may further include one or more optical isolators (ISO) on the main optical path, configured to ensure a unidirectional flow of light. However, this embodiment of this application is not limited thereto.

Optionally, the optical amplifier apparatus 300 may further include another unit. This is not limited in this embodiment of this application.

In another optional embodiment, a source node of the service data carried by the signal light may also include an optical amplifier apparatus. In this case, the optical amplifier apparatus may receive signal light transmitted by a signal light transmission apparatus of the source node and monitoring light transmitted by a monitoring light transmission apparatus of the source node, and process the received signal light and monitoring light. Specifically, a first amplifier unit in the optical amplifier apparatus may be configured to: receive the signal light transmitted by the signal light transmission apparatus of the source node, amplify the signal light to obtain amplified signal light, and output the amplified signal light. The hybrid filter unit may receive the amplified signal light output by the first amplifier unit, perform gain flattening filtering processing on the amplified signal light to obtain filtered signal light, and output the filtered signal light. The wavelength division multiplexing unit may be configured to: receive the filtered signal light output by the hybrid filter unit and the monitoring light transmitted by the monitoring light transmission apparatus of the source node, perform wavelength division multiplexing processing on the received monitoring light and the filtered signal light to obtain a fifth beam, and transmit the fifth beam to the external optical fiber connected to the downstream communications station. Optionally, the fifth beam may be the same as or different from the first beam. This is not limited in this embodiment of this application.

The following describes in detail the optical amplifier apparatus provided in this embodiment of this application with reference to specific examples.

Figure 7:
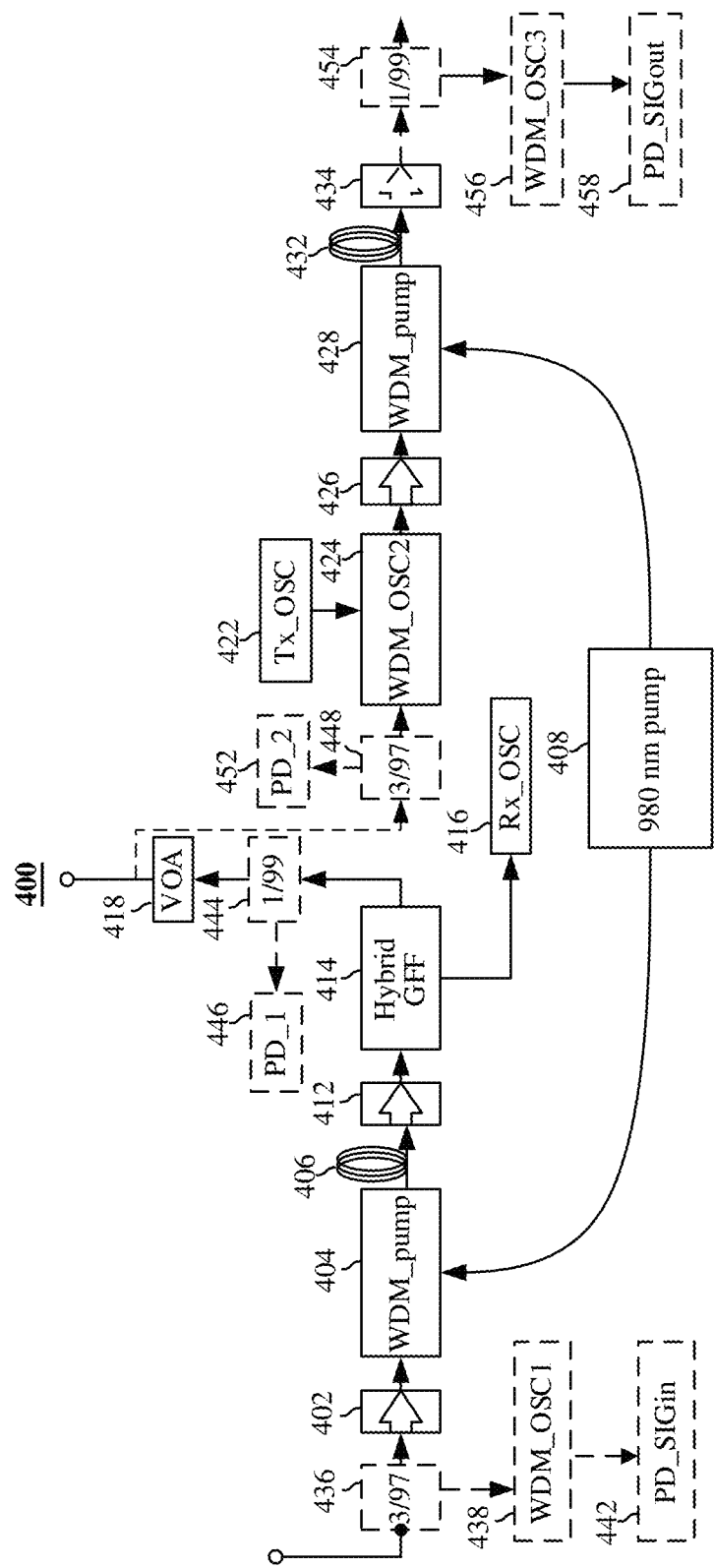
FIG. 7 is a schematic diagram of an example of an optical amplifier apparatus according to an embodiment of this application.

FIG. 7 is a schematic structural diagram of an example of an optical amplifier apparatus 400 according to an embodiment of this application. Herein, it is assumed that the optical amplifier apparatus 400 has a function of two-stage amplification, and the optical amplifier apparatus 400 belongs to a forwarding node of service data carried by signal light. However, this embodiment of this application is not limited thereto.

An optical isolator 402 allows only a beam in a specific direction to pass, to ensure unidirectional transmission of the beam. Specifically, the optical isolator 402 may be configured to receive a first beam input from an external optical fiber of the optical amplifier apparatus 400. The first beam may include signal light and monitoring light.

The optical amplifier apparatus 400 may optionally include a 3/97 beam splitter 436, a WDM_OSC1 438, and a PD_SIGin 442. The 3/97 beam splitter 436 is configured to: receive the first beam input from the external optical fiber of the optical amplifier apparatus 400, perform beam splitting processing on the first beam to obtain a first part and a second part of the first beam, output the first part to a main optical path, and output the second part to an optical branch, where a ratio of optical power of the first part to optical power of the second part is 97:3. In this case, the first beam received by the optical isolator 402 may be specifically the first part that is of the first beam and that is output by the 3/97 beam splitter 436. However, this is not limited in this embodiment of this application. The WDM_OSC1 438 may be configured to: receive the second part that is of the first beam and that is output by the 3/97 beam splitter 436, perform wavelength division demultiplexing processing on the second part to obtain the signal light and the monitoring light in the second part, and output the signal light in the second part. The PD_SIGin 442 may be configured to: receive the signal light in the second part output by the WDM_OSC1 438, and detect the signal light.

A pump light laser 408 is configured to transmit pump light. Optionally, a wavelength of the pump light may be 980 nm. However, this is not limited in this embodiment of this application.

A WDM_pump (WDM_pump) 404 is configured to: receive the first beam output by the optical isolator 402 and the pump light transmitted by the pump light laser 408, perform wavelength division multiplexing processing on the received beam and pump light to obtain a fourth beam, and output the fourth beam.

An EDF 406 is configured to: receive the fourth beam output by the WDM_pump 404, perform gain processing on the fourth beam to obtain a second beam, and output the second beam.

An optical isolator 412 is configured to: receive the second beam output by the EDF 406, and allow the second beam to be transmitted in a direction toward an exit.

A hybrid GFF 414 is configured to: receive the second beam output by the optical isolator 412, separate the signal light and the monitoring light from the second beam, and perform gain flattening filtering processing on the signal light in the second beam to obtain filtered signal light. Optionally, the hybrid GFF 414 may perform separation before filtering or may perform filtering before separation. This is not limited in this embodiment of this application.

An OSC detector (Rx_OSC) 416 may be configured to: receive the monitoring light output by the hybrid GFF 414, and detect the received monitoring light.

A VOA 418 may be configured to: receive the filtered signal light output by the hybrid GFF 414, perform power attenuation processing on the filtered signal light to obtain attenuated filtered signal light, and output the attenuated filtered signal light.

In an example, the optical amplifier apparatus 400 may further optionally include a 1/99 beam splitter 444 and an optical detector (PD_1) 446. The 1/99 beam splitter 444 may be configured to: receive the filtered signal light output by the hybrid GFF 414, perform beam splitting processing on the filtered signal light to obtain a first part and a second part of the filtered signal light, output the first part to the main optical path, and output the second part to the optical branch, where a ratio of optical power of the first part to optical power of the second part may be 99:1. In this case, the filtered signal light received by the VOA 418 may be specifically the first part that is of the filtered signal light and that is output by the 1/99 beam splitter 444. The PD_1 may receive the second part that is of the filtered signal light and that is output by the 1/99 beam splitter 444, and process the received second part. However, this embodiment of this application is not limited thereto.

An OSC transmitter (Tx_OSC) 422 may be configured to transmit the monitoring light.

A WDM_OSC2 424 may be configured to: receive the attenuated filtered signal light output by the VOA 418 and the monitoring light output by the Tx_OSC 422, perform wavelength division multiplexing processing on the attenuated filtered signal light and the monitoring light to obtain a third beam, and output the third beam.

In an example, the optical amplifier apparatus 400 may further optionally include a 3/97 beam splitter 448 and an optical detector (PD_2) 452. The 3/97 beam splitter 448 may be configured to: receive the attenuated filtered signal light output by the VOA 418, split the attenuated filtered signal light into a first part and a second part, output the first part to the main optical path, and output the second part to the optical branch, where a ratio of optical power of the first part to optical power of the second part is 97:3. In this case, the attenuated filtered signal light received by the WDM_OSC2 424 may be specifically the first part that is of the attenuated filtered signal light and that is output by the 3/97 beam splitter 448. A PD_2 452 may receive the second part that is of the attenuated filtered signal light and that is output by the 3/97 beam splitter 448, and process the received second part. However, this embodiment of this application is not limited thereto.

The optical isolator 426 may be configured to: receive the third beam output by the WDM_OSC2 424, and allow unidirectional transmission of the third beam.

The WDM_pump 428 may be configured to: receive pump light transmitted by the pump light laser 408 and the third beam output by the optical isolator 426, perform wavelength division multiplexing processing on the pump light and the third beam to obtain a sixth beam, and output the sixth beam.

An EDF 432 may be configured to: receive the sixth beam output by the WDM_pump 428, perform gain processing on the sixth beam to obtain a seventh beam, and output the seventh beam. The seventh beam may also be referred to as an amplified third beam.

The optical amplifier apparatus 400 may further optionally include an optical isolator 434, configured to: receive the seventh beam output by the EDF 432, and allow unidirectional transmission of the seventh beam.

The optical amplifier apparatus 400 may further optionally include a 1/99 beam splitter 454, a WDM_OSC3 456, and a PD_SIGout 458. The 1/99 beam splitter 454 may be configured to: receive the seventh beam output by the optical isolator 434, and perform beam splitting processing on the seventh beam to obtain a first part and a second part of the seventh beam, where a ratio of optical power of the first part to optical power of the second part is 99:1. The 1/99 beam splitter 454 may output the first part to the main optical path, for example, output the first part to an external optical fiber of the optical amplifier apparatus 400, and output the second part to the optical branch. The WDM_OSC3 456 may be configured to: receive the seventh beam output by the 1/99 beam splitter 454, perform wavelength division demultiplexing processing on the seventh beam to obtain the signal light and the monitoring light in the seventh beam, and output the signal light in the seventh beam. The PD_SIGout 458 may be configured to: receive the second part that is of the seventh beam and that is output by the 1/99 beam splitter 454, and process the received second part. However, this embodiment of this application is not limited thereto.

It should be understood that the foregoing is intended to help a person skilled in the art better understand the embodiments of this application, but not to limit the scope of the embodiments of this application. A person skilled in the art apparently can make various equivalent modifications or changes according to the examples described above, and such modifications or changes also fall within the scope of the embodiments of this application. For example, ratios of optical power of the foregoing various beam splitters are merely examples. This is not limited in the embodiments of this application.

Figure 8:
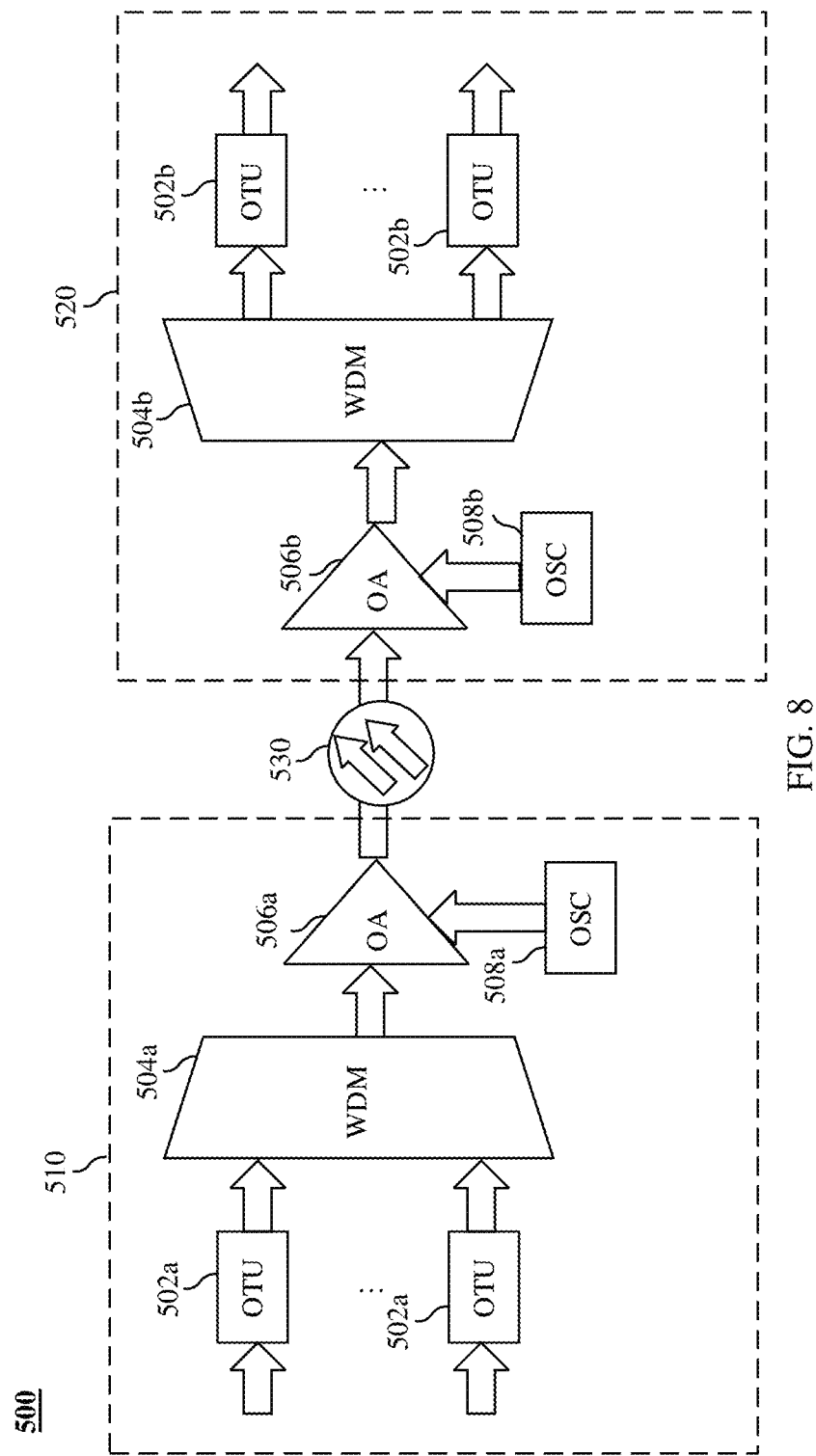
FIG. 8 is a schematic diagram of an example of an optical communications system according to an embodiment of this application.

An embodiment of this application further provides an optical communications system. The optical communications system may include a source node and a destination node, and optionally include at least one forwarding node. For example, the optical communications system may include a first node and a second node, and may optionally include a third node. The first node may be a source node of service data carried by signal light or an intermediate forwarding node. However, this embodiment of this application is not limited thereto. FIG. 8 is a schematic structural diagram of an example of an optical communications network 500 according to an embodiment of this application. As shown in FIG. 8, the optical communications network 500 includes a first station 510, a second station 520, and a transmission fiber 530 that is configured to perform optical communication between the first station 510 and the second station 520. In FIG. 8, it is assumed that the first station is used as a source station to transmit data to the second station. Optionally, the second station may be alternatively used as a source station to transmit data to the first station. Alternatively, both the first station and the second station may be used as forwarding stations of data. This is not limited in this embodiment of this application.

The first station 510 may include at least one OTU 502a, a WDM 504a, an optical amplifier (OA) 506a, and an OSC transceiver 508a. Each OTU 502a may transmit signal light of a wavelength, and signal light transmitted by different OTUs may have different wavelengths. The WDM 504a may receive the signal light transmitted by each of the at least one OTU 502a, perform wavelength division multiplexing processing on the received signal light to obtain a beam_1, and output the beam_1. An OSC transmitter 508a may transmit an OSC. Optionally, a wavelength of the OSC may be different from the wavelength of the signal light transmitted by any OTU 502a. The OA 506a may receive the OSC transmitted by the OSC transceiver 508a and the beam_1 output by the WDM 504a, amplify and perform gain flattening filtering processing on the beam_1 to obtain a beam_2, and perform wavelength division multiplexing processing on the beam_2 and the OSC to obtain a beam_3. The OA 506*a* may amplify the beam_1 once or twice to obtain the beam_2. Optionally, the OA 506*a* may directly output the beam_3, or may amplify the beam_3 and then output an amplified beam_3. This is not limited in this embodiment of this application.

The second station 520 may include at least one OTU 502*b*, a WDM 504*b*, an OA 506*b*, and an OSC transceiver 508*b*. The OA 506*b* may be configured to: receive the beam_3 transmitted by an optical fiber 530, and amplify and perform gain flattening filtering processing on the beam_3 to obtain a processed beam_3. A wavelength of signal light included in the beam_3 may fall within a filtering band for the gain flattening filtering processing. The OA 506*b* may further separate monitoring light and signal light from the amplified beam_3, for example, perform the separation operation by using a wavelength division demultiplexer, output the monitoring light to the OSC transceiver 508*b*, and output the signal light to the WDM 504*b*. After receiving the signal light output by the OA 506*b*, the WDM 504*b* may perform wavelength division demultiplexing processing on the signal light to obtain a beam of at least one type of wavelength, and respectively transmit the beam of the at least one type of wavelength to the at least one OTU 502*b*, and the OTU 502*b* may detect the received beam or perform other processing. This is not limited in this embodiment of this application.

It should be understood that FIG. 8 shows two stations as an example, and any quantity of stations may be included in the optical communications system. This is not limited in this embodiment of this application.

It should be further understood that in FIG. 8, the OSC transmitter and the OSC detector are integrated into the OSC transceiver, and the OSC transceiver and the OA are separately disposed independently of each other. In actual application, the OSC transceiver may be alternatively integrated into the OA, or the OSC transmitter and the OSC detector may be alternatively separately disposed independently of each other. In this case, the OSC transmitter and the OSC detector may be disposed independently of the OA, or at least one of the OSC transmitter and the OSC detector may be integrated into the OA. This is not limited in this embodiment of this application.

It should be further understood that the above description of the embodiments of this application focuses on differences between the embodiments, and reference may be made to the embodiments for the same or similar parts that are not mentioned. For brevity, details are not described herein again.

In addition, the terms "system" and "network" in this specification may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising:
a first amplifier; and
a hybrid filter, wherein the hybrid filter comprises a first output port and a second output port;
wherein the apparatus is comprised in a first station in an optical communications network;
wherein the first amplifier is configured to:
receive a first beam that is sent by a second station and that is transmitted by a first external optical fiber of the apparatus, wherein the first beam comprises signal light and first monitoring light; and
amplify the first beam to obtain a second beam; and
wherein the hybrid filter is configured to:
receive the second beam output by the first amplifier, and separate the first monitoring light and the signal light from the second beam;
transmit the first monitoring light in the second beam to a first light detector of the first station through the first output port; and
perform gain flattening filtering processing on the signal light in the second beam to obtain filtered signal light, and transmit the filtered signal light to a second external optical fiber of the apparatus through the second output port.

2. The apparatus according to claim 1, wherein:
the hybrid filter further comprises a first wavelength division demultiplexer and a gain flattening filter;
the first wavelength division demultiplexer is configured to:
receive the second beam output by the first amplifier;
perform wavelength division demultiplexing processing on the second beam to obtain the signal light and the first monitoring light in the second beam;
output the first monitoring light in the second beam through the first output port; and
output the signal light in the second beam to the gain flattening filter; and
the gain flattening filter is configured to:
receive the signal light that is in the second beam and that is output by the first wavelength division demultiplexer;
perform gain flattening filtering processing on the signal light in the second beam to obtain the filtered signal light; and
output the filtered signal light through the second output port.

3. The apparatus according to claim 1, wherein:
the hybrid filter further comprises a first wavelength division demultiplexer and a gain flattening filter;
the gain flattening filter is configured to:
receive the second beam output by the first amplifier; and
perform gain flattening filtering processing on the second beam to obtain the filtered second beam, wherein a filtering band of the gain flattening filter does not comprise a wavelength of the first monitoring light, and the filtered second beam comprises the filtered signal light and the first monitoring light; and
the first wavelength division demultiplexer is configured to:
receive the filtered second beam output by the gain flattening filter;
perform wavelength division demultiplexing processing on the filtered second beam to obtain the filtered signal light and the first monitoring light;
output the first monitoring light through the first output port; and
output the filtered signal light through the second output port.

4. The apparatus according to claim 1, wherein the hybrid filter is configured to:
transmit the filtered signal light to a second light detector of the first station through the second output port; or
transmit the filtered signal light to a third station through the second output port.

5. The apparatus according to claim 1, further comprising a wavelength division multiplexer, configured to:
receive the filtered signal light output by the hybrid filter through the second output port, and receive second monitoring light;
perform wavelength division multiplexing processing on the filtered signal light and the second monitoring light to obtain a third beam; and
transmit the third beam to a third station.

6. The apparatus according to claim 5, wherein:
the second monitoring light is transmitted by a transmitter of the first station; or
the apparatus further comprises a first beam splitter, configured to:
receive the first monitoring light output by the hybrid filter through the first output port;
perform beam splitting processing on the first monitoring light to obtain a first part of the first monitoring light and a second part of the first monitoring light;
transmit the first part of the first monitoring light to the first detector of the first station; and
transmit the second part of the first monitoring light to the wavelength division multiplexer, wherein the second monitoring light is the second part of the first monitoring light.

7. The apparatus according to claim 5, further comprising:
a second amplifier, configured to: receive the filtered signal light output by the hybrid filter through the second output port, and amplify the filtered signal light to obtain the amplified filtered signal light; and
wherein the wavelength division multiplexer is configured to:
receive the amplified filtered signal light output by the second amplifier; and
perform wavelength division multiplexing processing on the amplified filtered signal light and the second monitoring light to obtain the third beam.

8. The apparatus according to claim 5, further comprising a second amplifier, configured to:
receive the third beam output by the wavelength division multiplexer, and amplify the third beam to obtain the amplified third beam; and
transmit the amplified third beam to the first station.

9. The apparatus according to claim 5, further comprising:
a second beam splitter,
a second wavelength division demultiplexer; and
a first optical power detector;
wherein the second beam splitter is configured to:
receive the third beam output by the wavelength division multiplexer;
perform beam splitting processing on the third beam to obtain a first part of the third beam and a second part of the third beam, wherein optical power of the first part of the third beam is greater than optical power of the second part of the third beam; and
transmit the first part of the third beam to the second external optical fiber; and wherein the second wavelength division demultiplexer is configured to:
    receive the second part that is of the third beam and that is output by the second beam splitter; and
    perform wavelength division demultiplexing processing on the second part of the third beam to obtain the signal light and the second monitoring light in the second part of the third beam; and
wherein the first optical power detector is configured to:
    receive the signal light that is in the second part of the third beam and that is output by the second wavelength division demultiplexer; and
    detect power of the received signal light.

10. The apparatus according to claim 1, wherein:
the first amplifier comprises a pump light transmitter, a wavelength division multiplexer, and an erbium-doped fiber;
the pump light transmitter is configured to transmit pump light;
the wavelength division multiplexer is configured to receive the first beam transmitted by the first external optical fiber and the pump light transmitted by the pump light transmitter, and perform wavelength division multiplexing processing on the received first beam and pump light to obtain a fourth beam; and
the erbium-doped fiber is configured to amplify the fourth beam output by the wavelength division multiplexer to obtain the second beam.

11. The apparatus according to claim 1, further comprising:
a third beam splitter;
a third wavelength division demultiplexer; and
a second optical power detector;
wherein the third beam splitter is configured to:
    receive the first beam transmitted by the first external optical fiber; and
    perform beam splitting processing on the first beam to obtain a first part of the first beam and a second part of the first beam, wherein optical power of the first part of the first beam is greater than optical power of the second part of the first beam;
wherein the first amplifier is configured to receive a first part that is of the first beam and that is output by the third beam splitter, and amplify the first part of the first beam to obtain the second beam;
wherein the third wavelength division demultiplexer is configured to:
    receive the second part that is of the first beam and that is output by the third beam splitter; and
    perform wavelength division demultiplexing processing on the second part of the first beam to obtain the signal light and the first monitoring light in the second part of the first beam; and
wherein the second optical power detector is configured to:
    receive the signal light that is in the second part of the first beam and that is output by the third wavelength division demultiplexer; and
    detect power of the received signal light.

12. A station, comprising:
a first light detector; and
an optical amplifier;
wherein the optical amplifier is configured to:
    receive, through a first external optical fiber of the optical amplifier, a first beam sent by an upstream station, wherein the first beam comprises signal light and first monitoring light;
    amplify the first beam to obtain a second beam; and
    separate the first monitoring light and the signal light from the second beam, and transmit the first monitoring light in the second beam to the light detector;
wherein the first light detector is configured to: receive the first monitoring light output by the optical amplifier, and detect the first monitoring light; and
wherein the optical amplifier is further configured to:
    perform gain flattening filtering processing on the signal light in the second beam to obtain filtered signal light; and
    transmit the filtered signal light to a second external optical fiber of the optical amplifier.

13. The station according to claim 12, wherein the optical amplifier is configured to:
perform wavelength division demultiplexing processing on the second beam to obtain the signal light and the first monitoring light in the second beam;
output the first monitoring light in the second beam to the first light detector; and
perform gain flattening filtering processing on the signal light in the second beam to obtain the filtered signal light.

14. The station according to claim 12, wherein the optical amplifier is configured to:
perform gain flattening filtering processing on the second beam to obtain the filtered second beam, wherein a filtering band for the gain flattening filtering processing does not comprise a wavelength of the first monitoring light, and the filtered second beam comprises the filtered signal light and the first monitoring light; and
perform wavelength division demultiplexing processing on the filtered second beam to obtain the filtered signal light and the first monitoring light.

15. The station according to claim 12, wherein the optical amplifier is further configured to:
perform wavelength division multiplexing processing on the filtered signal light and second monitoring light to obtain a third beam, and transmit the third beam to a downstream station through the second external optical fiber.

16. The station according to claim 15, wherein:
the station further comprises a light transmitter, configured to transmit the second monitoring light, and the optical amplifier is further configured to receive the second monitoring light transmitted by the light transmitter; or
the optical amplifier is further configured to:
    perform beam splitting processing on the first monitoring light in the second beam to obtain a first part of the first monitoring light and a second part of the first monitoring light; and
    transmit the first part of the first monitoring light to the first light detector of the station, wherein the second monitoring light is the second part of the first monitoring light.

17. The station according to claim 15, wherein the optical amplifier is further configured to:
- before performing wavelength division multiplexing processing on the second monitoring light and the filtered signal light, amplify the filtered optical signal to obtain the amplified filtered optical signal; and
- wherein performing wavelength division multiplexing processing on the second monitoring light and the filtered signal light comprises:
  - performing, by the optical amplifier, wavelength division multiplexing processing on the second monitoring light and the amplified filtered signal light.

18. The station according to claim 15, wherein the optical amplifier is further configured to:
- before transmitting the third beam to the downstream station through the second external optical fiber, amplify the third beam to obtain the amplified third beam; and
- wherein transmitting the third beam to the downstream station through the second external optical fiber comprises:
  - transmitting, by the optical amplifier, the amplified third beam to the downstream station through the second external optical fiber.

19. The station according to claim 12, further comprising: a second light detector;
- wherein the optical amplifier is configured to transmit the filtered signal light to the second light detector through the second external optical fiber; and
- wherein the second light detector is configured to demodulate the filtered signal light transmitted by the optical amplifier to obtain data carried by the filtered signal light.

20. A system, comprising:
an optical station; and
an upstream station,
wherein the optical station comprises a light detector and an optical amplifier;
wherein the optical amplifier is configured to:
- receive, through a first external optical fiber of the optical amplifier, a first beam sent by an upstream station, wherein the first beam comprises signal light and first monitoring light;
- amplify the first beam to obtain a second beam;
- separate the first monitoring light and the signal light from the second beam, and transmit the first monitoring light in the second beam to the light detector;

wherein the light detector is configured to receive the first monitoring light output by the optical amplifier, and detect the first monitoring light; and
wherein the optical amplifier is further configured to:
- perform gain flattening filtering processing on the signal light in the second beam to obtain filtered signal light, and transmit the filtered signal light to a second external optical fiber of the optical amplifier;
wherein the upstream station is configured to:
- transmit the signal light and the first monitoring light;
- amplify the signal light to obtain an amplified signal light;
- perform wavelength division multiplexing processing on the first monitoring light and the amplified signal light to obtain a first beam; and
- transmit the first beam to the optical station through the first external optical fiber.

* * * * *